Figure 1:
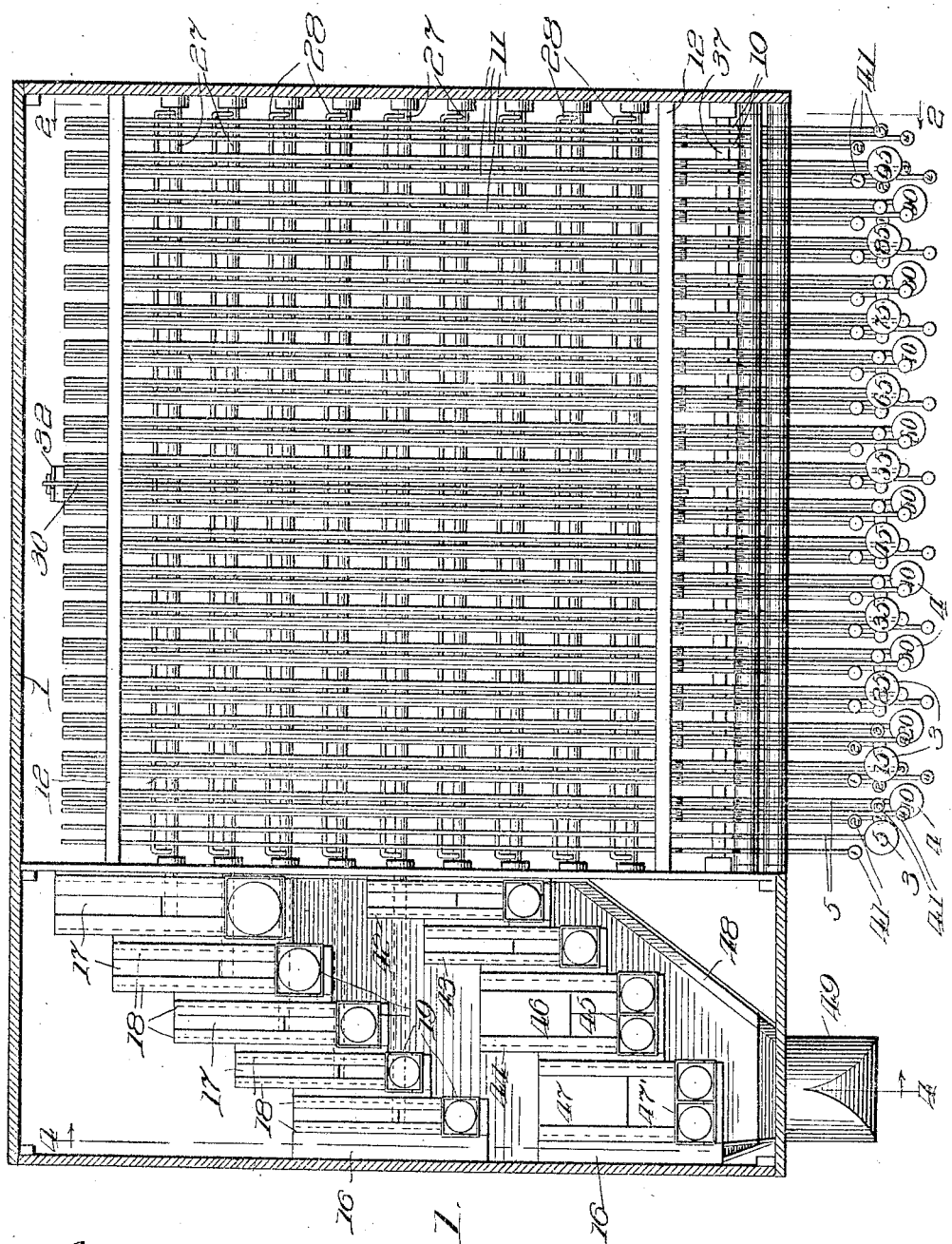

No. 826,675. PATENTED JULY 24, 1906.
H. E. MADISON.
CHANGE MAKER.
APPLICATION FILED NOV. 6, 1905.

6 SHEETS—SHEET 1.

Witnesses:
H. S. Gaither
M. A. Kiddy

Inventor:
Herbert E. Madison
by Wm. F. Belt, atty

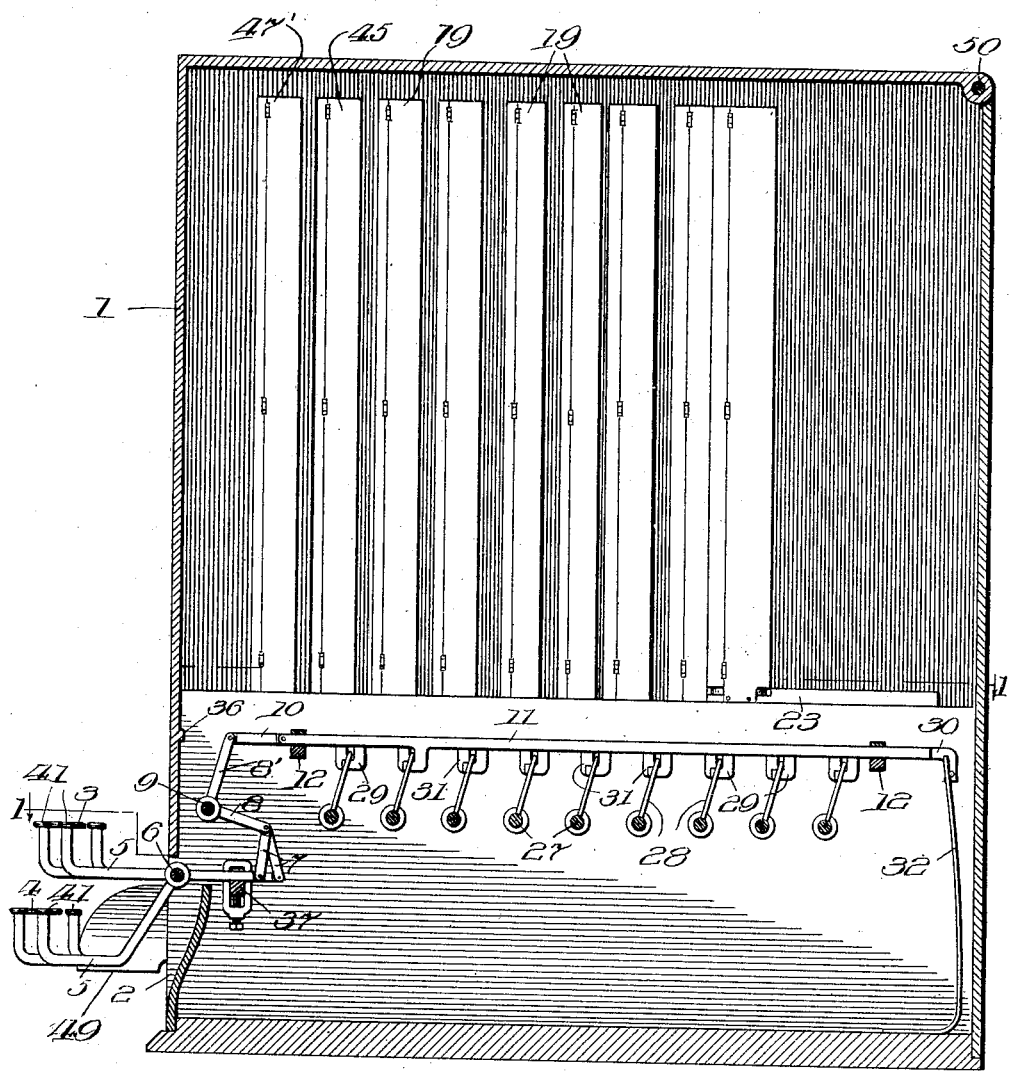

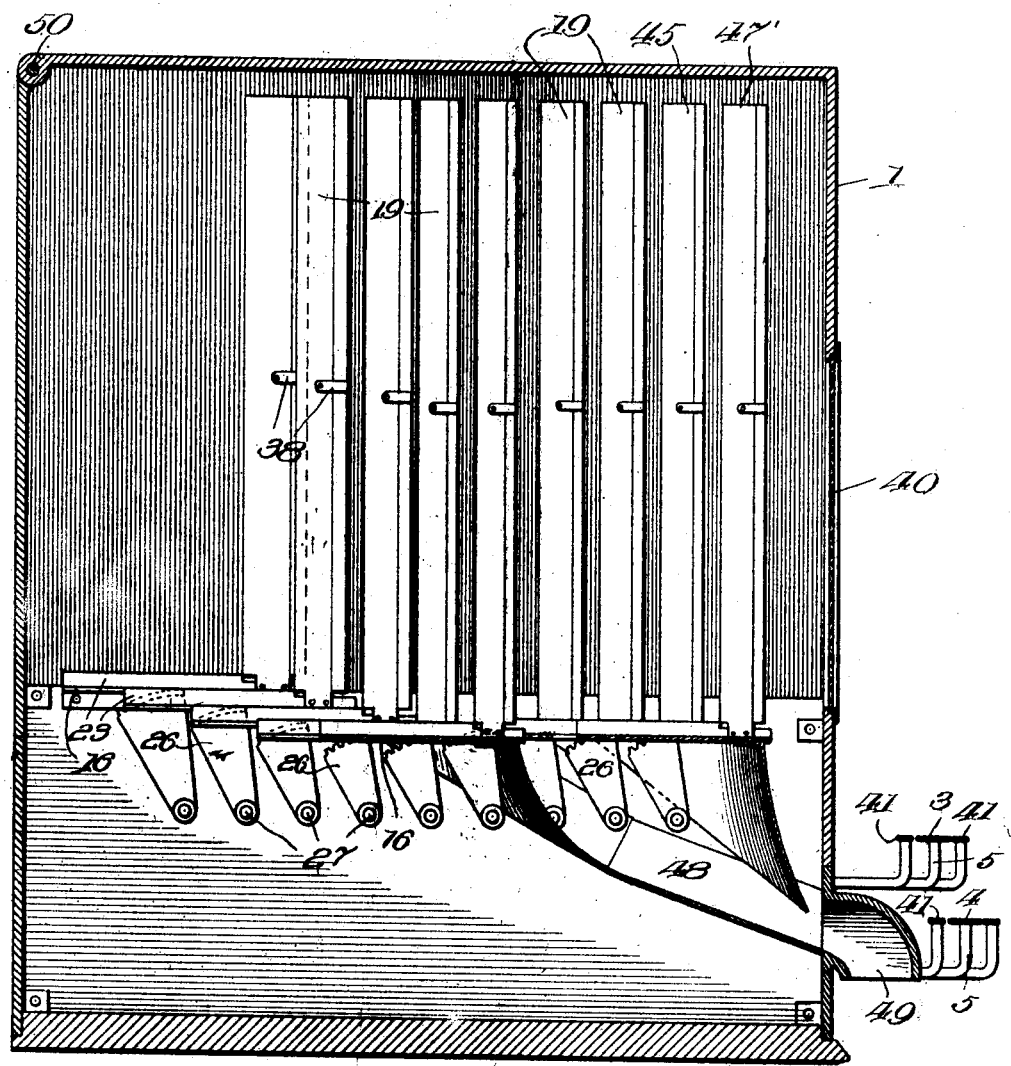

No. 826,675. PATENTED JULY 24, 1906.
H. E. MADISON.
CHANGE MAKER.
APPLICATION FILED NOV. 6, 1905.
6 SHEETS—SHEET 4.
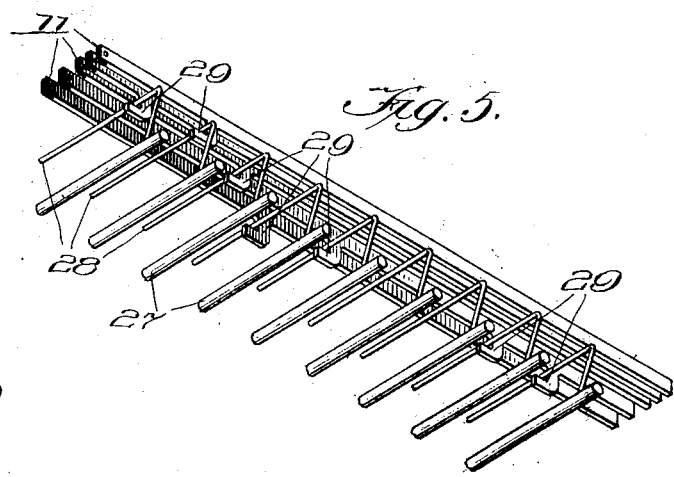
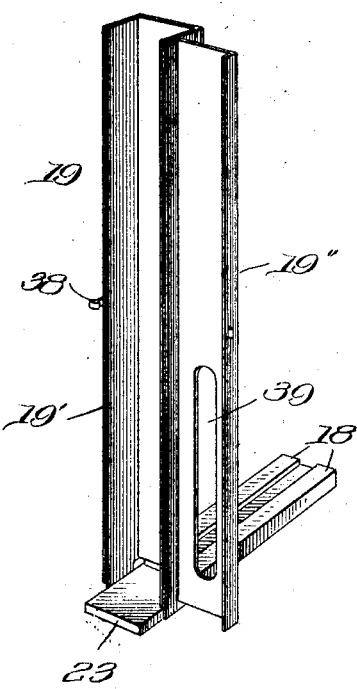
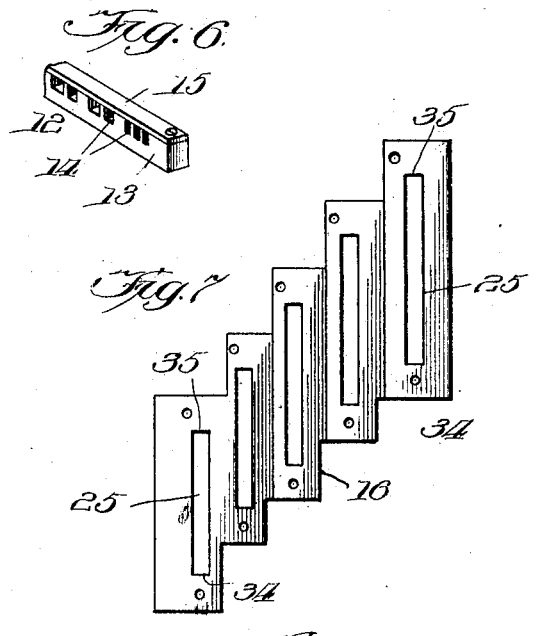
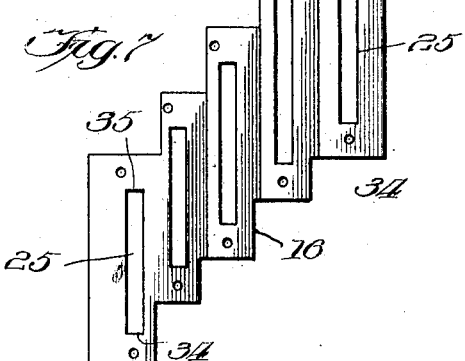
Witnesses:
H. F. Gaither
M. Q. Kiddie
Inventor:
Herbert E. Madison
by Wm. F. Bell, atty

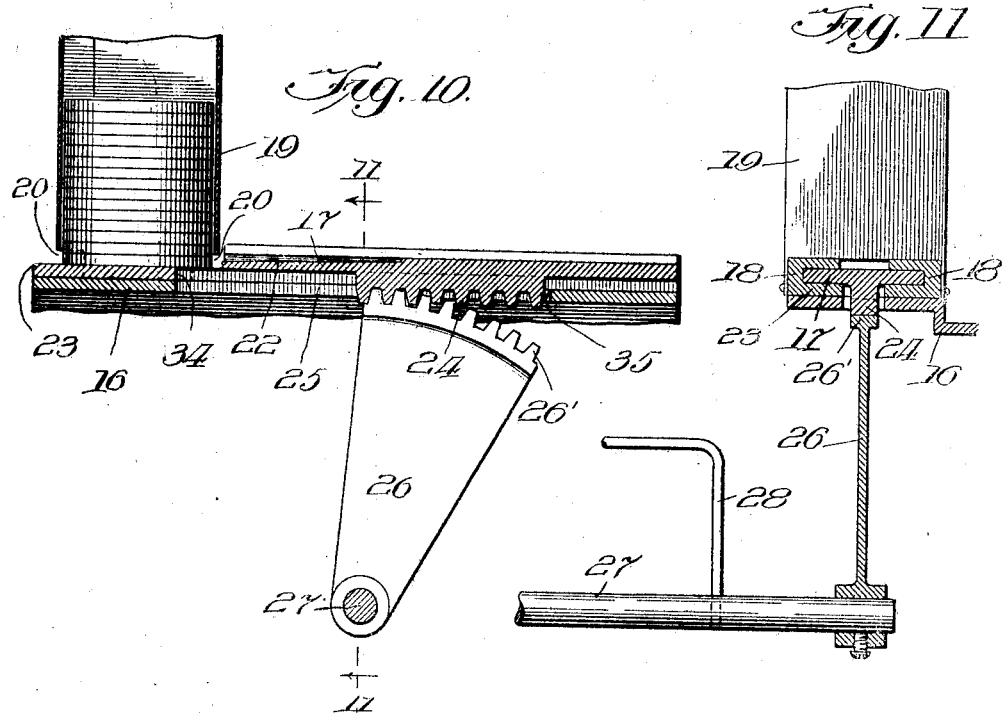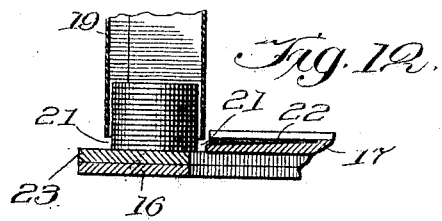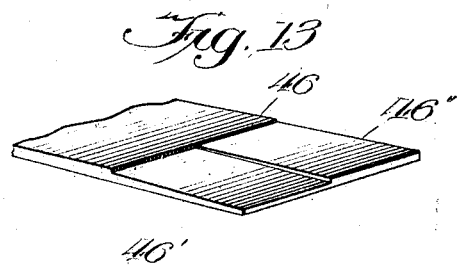

No. 826,675. PATENTED JULY 24, 1906.
H. E. MADISON.
CHANGE MAKER.
APPLICATION FILED NOV. 6, 1905.
6 SHEETS—SHEET 6
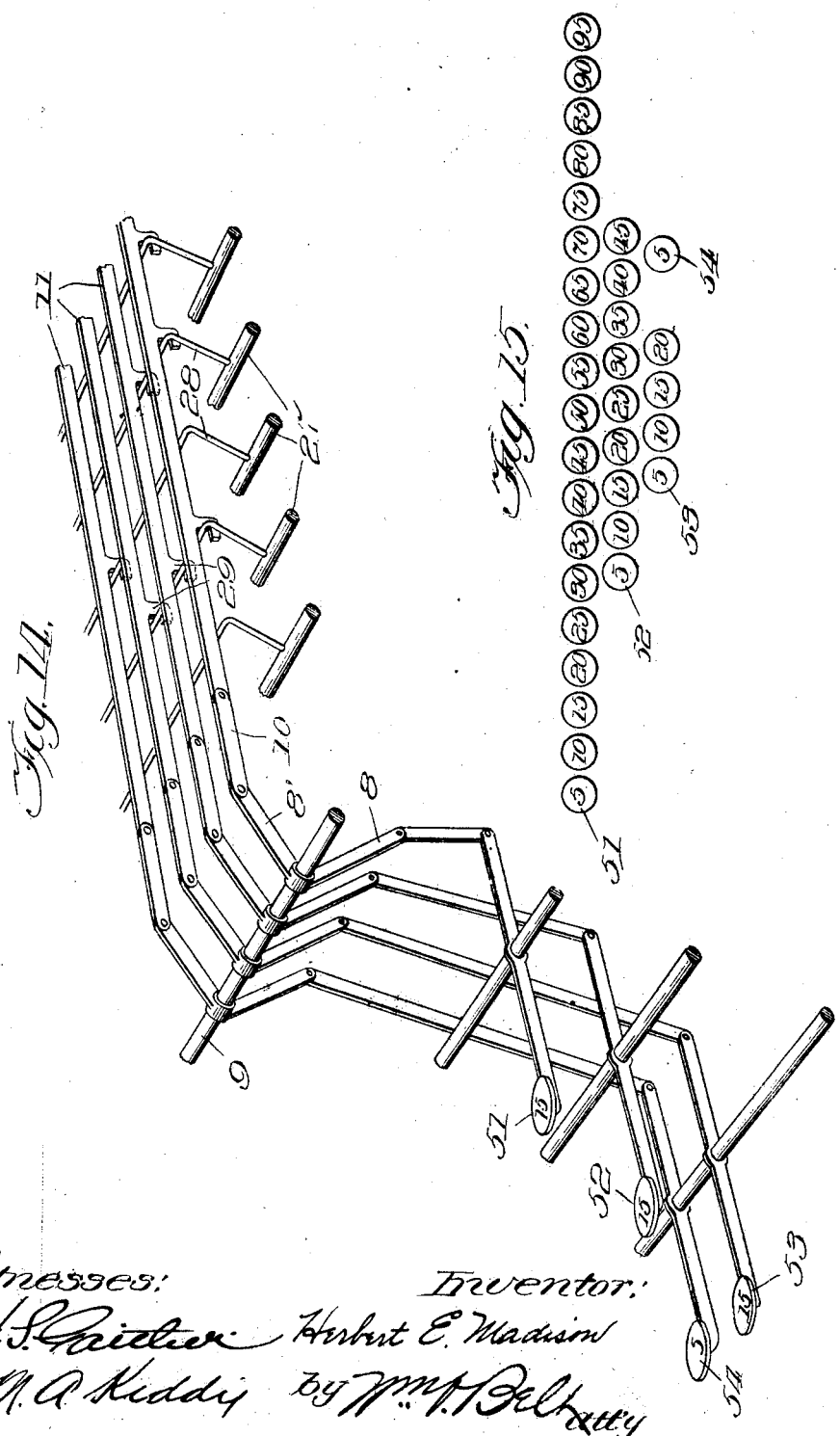

UNITED STATES PATENT OFFICE.

HERBERT E. MADISON, OF CHICAGO, ILLINOIS.

CHANGE-MAKER.

No. 826,675.　　　Specification of Letters Patent.　　Patented July 24, 1906.

Application filed November 6, 1905. Serial No. 285,974.

*To all whom it may concern:*

Be it known that I, HERBERT E. MADISON, a citizen of the United States, residing at Chicago, in the county of Cook and State of Illinois, have invented new and useful Improvements in Change-Makers, of which the following is a specification.

The object of this invention is to provide a machine of simple and substantial construction embodying comparatively few parts for accurately and automatically making change in multiples of five cents or in multiples of one cent.

In the accompanying drawings I have illustrated one form in which the invention can be embodied, and, referring thereto, Figure 1 is a horizontal sectional view on the line 1 1 of Fig. 2. Fig. 2 is a vertical sectional view on the line 2 2 of Fig. 1. Fig. 3 is a detail sectional view of the retracting slide-bar operated by a coil-spring. Fig. 4 is a vertical sectional view on the line 4 4 of Fig. 1. Fig. 5 is a perspective view showing one set of the slide-bars and showing their relation to the ejector-shafts and yokes. Fig. 6 is a detail view of the guide. Figs. 7 and 8 are detail views of the support for the ejectors. Fig. 9 is a perspective view of one coin-holder. Fig. 10 is an enlarged sectional view of one ejector mechanism. Fig. 11 is a sectional view on the line 11 11 of Fig. 10. Fig. 12 is a detail sectional view of the two-dimes ejector. Fig. 13 is a detail view of the three-cents ejector. Fig. 14 is a perspective view of the five and fifteen cents keys, and Fig. 15 illustrates the keyboard of a machine embodying the invention and adapted to give the proper change when a key representing the amount of purchase is struck.

Referring to the drawings, 1 is a casing of any suitable shape and size, within which is preferably contained all of the operative mechanism of the machine with the exception of the key-levers, which project through an opening 2 in the front of the casing.

I will first describe the machine as constructed for making change in multiples of five cents and then describe the mechanism for making the odd change.

The keys numbered in multiples of five from five to ninety-five are arranged in two rows one above the other for convenience in operation, the odd-numbered keys being preferably located in a plane above the even-numbered keys 4. Each of these keys is carried by a key-lever 5, Fig. 1, pivotally mounted between its ends on a rod 6 and projecting within the casing. The inner end of the key-lever is pivotally connected by a link 7 to one arm 8 of an angle-lever, which is pivotally mounted on a rod 9, Fig. 2. The other arm 8' of said angle-lever is pivotally connected by a link 10 to a horizontal slide-bar 11, extending from front to rear of the machine and guided in the guide-bars 12. The rods 6 9 and the guide-bars are suitably supported in the casing, and the guide-bars each comprise a bar 13, provided with slots 14, properly spaced apart by suitable partitions to accommodate the various slides, Fig. 6. The removable plate 15 holds the slide-bars in their proper place in the guides.

To obtain the proper change in multiples of five cents, I provide five independent ejector mechanisms, one for half-dollars, one for quarter-dollars, one for nickels, one for single dimes, and one for double dimes, these several mechanisms being mounted on a support 16, Fig. 7, within the casing. Each ejector mechanism comprises a slidable ejector 17, operating in channel-guides 18 of a bed-plate 23, fastened on the support 16. An upright coin-holder 19 is mounted in front of each ejector-slide and is cut away at the front and rear of its lower end at 20 to permit the ejector-slide to be projected through the holder. The holders for the half-dollars, quarter-dollars, nickels, and single dimes are cut away at their lower ends to permit the bottom coin only to be discharged from the holder by the ejector. To make change in a simple and convenient manner, it is desirable to have one ejector mechanism for discharging two dimes at one time, and in Fig. 12 I have shown a two-dimes-ejector mechanism which differs from the others only in the respect that the lower end of the holder is cut away at 21 sufficiently to permit the ejector to discharge two dimes at one time, the ejector being shaped at its forward end to engage two dimes for this purpose. I prefer to bevel the upper side of the forward end of the ejector-slide at 22, so that the ejector-slide may be more easily withdrawn from beneath the stack of coins and so that the stack of coins will be permitted to fall slowly to position on the bed 23. Each ejector-slide is provided on its under side with a toothed rack 24, which projects downward through a slot 25 in the support and meshes with a segment-gear 26, rigidly mounted on a rock-shaft 27. The rock-shaft is supported in the casing and carries a yoke 28, projecting upwardly beneath and adjacent to all of the slide-bars. For every ejector there is an independent rock-shaft and yoke, and it will be readily understood that each key must be adapted through the medium of its slide-bar to rock those shafts which will operate the ejectors to discharge the proper amount of change.

In Figs. 1 to 13 the keys represent the change to be delivered and each slide-bar is provided with hooks 29, suitably disposed to engage the proper yokes for operating the ejector mechanisms which will discharge the change designated by the key connected with said slide-bar. For example, the five-cent key has its slide-bar provided with one hook to engage the yoke of the rock-shaft associated with the nickel-ejector, and the ninety-five-cent key has its slide-bar provided with three hooks to engage the yokes of the rock-shafts associated with the half-dollar, the quarter-dollar, and the two-dimes ejectors.

A retracting slide-bar 30 is guided in the guide-bars 12 and is provided with hooks 31 to engage all of the yokes, so that this retracting slide-bar will always be moved forward at each operation of a key whether one yoke or more than one yoke is operated. This retracting slide-bar is under constant spring-tension tending to return it to normal position, and I may employ a leaf-spring 32, Fig. 2, or a coil-spring 33, Fig. 3, for this purpose. As soon as the pressure is removed from the key the spring acting on the retracting slide-bar will return this bar and the yokes, which have been operated, as well as the entire ejector mechanisms, to their normal position at rest.

The forward and rearward movements of each ejector-slide are limited by the engagement of the rack 24 with the end walls 34 and 35 of the slot 25 in the support, Figs. 7, 10. These end walls constitute stops for the ejector-slide. I may also provide a cushioned stop 36 to be engaged by the lever-arms 8', and to form an additional stop for limiting the return movement of the several parts which are actuated by the keys I may provide an adjustable stop 37 in the form of a cross-bar located beneath the inner ends of the key-levers 5.

The coin-holders 19, Fig. 9, are preferably rectangular in cross-section and made in two parts, one of which, 19', is fastened to the bed-plate 23 and the other, 19'', of which is hinged to said part 19'. A fastening device 38 of suitable character is provided to lock the parts together after the coins have been stacked in the holder. I provide a sight-opening 39 in the front of each holder and a window 40 in the front of the casing, Fig. 4, so that the operator may readily ascertain when the coin-supply in any holder needs replenishing.

The machine can be made, as shown in Figs. 14 and 15, to deliver the proper change by striking the key representing the amount of purchase. In this construction there should be separate rows of keys 51, 52, and 53 to be used to deliver change from dollars, half-dollars, and quarters, respectively, and a single key to make change of a dime. These keys are all connected up with the yokes by the same means heretofore described, but in such a manner that when a key representing the amount of purchase is struck change of the proper amount will be delivered. If one dollar is offered in payment for a fifteen-cent check, the fifteen-cent key in the dollar row 51 would be struck and eighty-five cents change delivered. If a half-dollar is offered in payment of a fifteen-cent check, the fifteen-cent key in the half-dollar row 52 would be struck and thirty-five cents change delivered. If a quarter is offered in payment of a fifteen-cent check, the fifteen-cent key in the quarter row 53 would be struck and ten cents change delivered. If ten cents is offered in payment of a five-cent check, the five-cent key 54 would be struck and five cents change delivered.

Fig. 15 illustrates diagrammatically a keyboard of this character, and Fig. 14 shows in detail the connections of the fifteen-cent keys of the three rows and also the connections of the single five-cent key with the yokes on the rock-shafts, which rock-shafts operate the ejector-slides in precisely the same manner heretofore described.

To make change in odd cents—that is to say, in other amounts than exact multiples of five—I provide a series of minor keys disposed in juxtaposition to each of the multiple of five keys (which may be designated generally the "major" keys) and arranged to be operated simultaneously with the major key with which they are associated, as shown in Fig. 1. I provide, preferably, four minor keys 41 for each major key and arrange them close to the major key, so that any one of them can be operated at the same time and by the same finger used to operate the major key, or the minor key can be operated by the middle finger at the same time that the major key is operated by the forefinger. These minor keys may be operated independently of the major keys if occasion requires to deliver one, two, three, or four cents in change. The minor keys are carried by key-levers which operate slide-bars, and these slide-bars are associated with yokes on rock-shafts which carry toothed segments adapted to operate ejector-slides, as heretofore described. Minor keys may be used with the major keys in the construction of Figs. 14, 15 in like manner.

I provide ejector mechanisms for discharging one cent, two cents, three cents, and four cents. The one-cent ejector 42 is like the half-dollar, quarter-dollar, nickel, and single-dime ejectors. The two-cents ejector 43 is like the two-dimes ejector. The three-cents ejector 44 comprises a holder 45, constructed to receive two stacks of cents, and the ejector-slide 46, Fig. 13, is shaped at 46' like the one-cent or any of the other single-coin ejectors to discharge one cent and is shaped at 46'' like the two-cents and two-dimes ejectors to discharge two cents, whereby at each operation of the ejector-slide 46 three cents will be discharged, one from one stack of coins and two from the other stack. The four-cents-ejector mechanism 47 also comprises a double holder 47', constructed to receive two stacks of coins, and the ejector-slide is constructed like the two-cents and two-dimes ejector slides to eject two cents from each stack at each operation of the slide. These ejector mechanisms for cents are located, preferably, in front of the other ejector mechanisms for economy of space, and all of these mechanisms discharge the coins into a chute 48, which terminates in a spout 49 on the front of the machine at one side of the keys, so that the operator can operate the keys with one hand and receive the change in the other.

It will be understood, of course, that each of the one-cent keys is connected to operate the rock-shaft associated with the one-cent-ejector mechanism and each of the two-cent keys is arranged to operate the two-cents-ejector mechanisms, and so on. The coin-holders can be made of any desired height and the casing may be hinged at 50, so that the top can be thrown back to permit access to all of the inclosed parts of the mechanism, as well as to refill the holders.

The machine is simple in construction, substantial in design, and embodies but comparatively few parts. The arrangement is such that a number of coins can be discharged as easily and with no more effort than a single coin. Thus ninety-five cents involving the operation of the half-dollar, quarter-dollar, and two-dimes ejectors, will be delivered by the operation of a single key just as one nickel will be delivered by the operation of a single key, and the parts are of such a simple character that all the keys can be operated with no appreciable difference in effort.

I prefer to arrange all of the coin-holders and ejector mechanisms at the left side of the slide-bars and keys for economy of space and convenience in operation. This arrangement enables the operator to use his right hand in manipulating the keys and his left hand to receive the change.

The distance between the pivot center and the gear and the length of the gear of each segment-gear is proportioned to the diameter of the coin which the ejector mechanism is designed to discharge. Thus the half-dollar-ejector mechanism will have a larger segment adapted to travel in a greater arc than the dime-ejectors, so that the ejector-slide in each instance will be projected entirely through the holder. The width of the ejector-slides is also preferably made to correspond substantially with the diameter of the coins.

I have illustrated and described my machine in an embodiment designed to make change in the fractional currency of the United States; but it is obvious that the machine can be easily adapted for coins of any other country. In fact, the denominations of the coins is wholly immaterial, as the machine can be employed to deliver coins of any denomination by properly proportioning the parts.

Having thus fully described my invention, what I claim, and desire to secure by Letters Patent, is—

1. In a change-maker, the combination of a series of keys, a series of coin-ejectors, and means actuated by said keys for operating said ejectors and imparting to each ejector a movement proportioned to the diameter of the coin it is adapted to discharge.

2. In a change-maker, the combination of a series of keys, a series of rock-shafts adapted to be operated by the keys, a coin-ejector for each rock-shaft and comprising an ejector-slide, a rack on said slide, and a segment-gear on said rock-shaft and meshing with said rack.

3. In a change-maker, the combination of a series of keys, a series of rock-shafts adapted to be operated by the keys, a coin-ejector for each rock-shaft and comprising a rack, and a segment-gear on said rock-shaft meshing with said rack and proportioned to the diameter of the coin said ejector operates upon.

4. In a change-maker, the combination of a series of keys, a series of rock-shafts in the same horizontal plane adapted to be operated by the keys, a series of segment-gears one on each rock-shaft, and a series of coin-ejectors in several horizontal planes above said segment-gears, each of said segment-gears being proportioned in height and length to the diameter of the coin to be discharged.

5. In a change-maker, the combination of a series of keys, a key-lever carrying each key, a slide-bar connected with and operated by each key, a series of rock-shafts beneath the slide-bars, a yoke on each rock-shaft projecting upwardly in juxtaposition to the slide-bars, hooks on the slide-bars to engage said yokes on the forward movement of the slide-bars and operate the rock-shafts, a series of coin-ejectors one for each rock-shaft and comprising a rack, and segment-gears on said rock-shafts meshing with said racks.

6. In a change-maker, the combination of a series of keys, a key-lever carrying each key, a slide-bar for each key connected with its lever, a series of rock-shafts, a yoke on each rock-shaft projecting upwardly in juxtaposition to the slide-bars, hooks on the slide-bars at one side of the yokes to engage the yokes on the forward movement of the slide-bars and operate the rock-shafts, a series of coin-ejectors each comprising a rack, segment-gears on the rock-shafts and meshing with said racks, a spring-controlled retracting-bar, and hooks on said retracting-bar arranged to engage all of the yokes on the side opposite the hooks on the slide-bars to return all of the parts to normal position.

7. A series of major keys for ejecting coins of certain values, which values are successive multiples of a certain unit, and a series of sets of minor keys, one set in proximity to each major key, the minor keys of each set being operable to eject coins in amounts representing the same fractional denominations of said unit.

8. In a change-maker, the combination of a major key, and a series of minor keys arranged in juxtaposition to said major key, any one of said minor keys being operable simultaneously with said major key.

9. In a change-maker, the combination of a series of major keys, a series of minor keys arranged around each major key and in approximately the same horizontal plane, a series of coin-ejectors connected to the major keys, and a separate series of coin-ejectors connected to each series of minor keys.

10. In a change-maker, the combination of a series of major keys representing successive multiples of a certain unit, a series of coin-ejectors connected to said major keys, a series of minor keys arranged around each major key, each series of minor keys representing the same fractional denominations of said unit, said minor keys being arranged in juxtaposition to said major keys so that any minor key in a series may be operated simultaneously with its major key, and a series of coin-ejectors connected to said minor keys.

11. In a change-maker, the combination of a series of major keys, a series of minor keys in juxtaposition to each major key, a series of rock-shafts, a series of slide-bars, one connected to each of the major and minor keys and adapted to operate the rock-shafts, a coin-ejector for each rock-shaft comprising a rack, and segment-gears on the rock-shafts meshing with said racks.

12. In a change-maker, the combination of a series of major keys, a series of minor keys around each major key, a series of coin-ejectors connected to the major keys, and series of coin-ejectors located in front of the other series of coin-ejectors and connected to the minor keys.

13. In a change-maker, the combination of a series of major keys, a series of minor keys, a series of rock-shafts, a series of slide-bars one connected to each key and adapted to operate said rock-shafts, and two series of coin-ejectors located at one side of the slide-bars with one series in front of the other, one series of coin-ejectors being connected to the series of major keys and the other series of coin-ejectors being connected to the series of minor keys.

14. In a change-maker, the combination of a slotted support, a series of slidable coin-ejectors mounted on said support and each comprising a rack projecting downward through a slot in said support, and means for operating said ejector, the end walls of each slot constituting stops to be engaged by the ends of the rack to limit the forward movement and rearward movement of the ejector.

15. In a change-maker, the combination of two coin-holders, and an ejector-slide operating beneath said coin-holders and constructed to eject two coins from one holder and one from the other.

HERBERT E. MADISON.

Witnesses:
W. E. TIMMERMAN,
WM. O. BELT.